Patented Apr. 21, 1936

2,038,106

UNITED STATES PATENT OFFICE 2,038,106

CEMENT CORK SHINGLE

Norman P. Harshberger, Scarsdale, N. Y., assignor to The Barrett Company, New York, N. Y., a corporation of New Jersey No Drawing. Application September 17, 1931, Serial No. 563,355

1 Claim. (Cl. 108—8)

My invention relates to molded cementitious products, such as shingles, tiles, siding material and the like, and to methods of producing the same, and particularly to that type of molded articles in which Portland cement or a similar inorganic cementing agent is employed.

Shingles, tiles and products of the type to which my invention relates, are commonly produced from mixtures of Portland cement, sand, asbestos fiber and the like in various proportions, and the resulting products, in which the cement has set, are hard and brittle. The materials used in producing articles of this type are relatively heavy, i. e., the materials have a specific gravity of 2.0 to 3.0 or higher and therefore shingles and similar articles produced from these materials are comparatively heavy. The specific gravities of several products of this type now marketed are found to vary from about 2.10 to 2.4. Because of the weight of these products they are not suitable for use on roof decks of relatively light construction. Furthermore, shingles made of cement and asbestos or similar materials, are easily broken during handling or shipping the same. Because of the hardness of shingles produced from Portland cement and asbestos, they are difficult to apply to a roof and when nails are driven through the shingles in laying the same, the shingles are often injured or destroyed.

I have discovered that these objections to shingles and similar articles in which Portland cement or other inorganic cement is used, can be overcome and durable light-weight shingles, having a specific gravity less than 2, and resistant to fracture can be produced by incorporating granulated cork with the materials from which the shingles or other molded articles are produced. The cork, being very light in weight, ordinarily having a specific gravity of 0.22 to 0.26, tends to float the cement and asbestos fiber in mixing the materials rendering the mixing operation easier than when the constituents of the mixture are all comparatively heavy as in prior practice. The cork also increases the bulk without increasing the weight of the resulting product. Due to the inherent resiliency of cork, articles produced in accordance with my invention are not as brittle as those heretofore produced and therefore shingles produced as hereinafter described containing granulated cork as a constituent thereof, can be readily nailed to a roof without breaking or injuring the shingles.

Among the objects of my invention are to produce shingles and similar articles of the molded type in which Portland cement or similar inorganic cement is used, which shingles are light in weight and can be nailed to a roof without danger of breaking or injuring the same, to provide cheap and durable shingles of the type described and to provide simple methods of producing the same.

The term "cement" as used throughout the specification and claim is intended to refer to Portland cement and similar inorganic cementing agents as distinguished from glue, asphalt, bituminous cements and similar organic cementing agents.

In accordance with my invention I employ granulated cork as a constituent of the mix from which shingles are produced and mix this material with cement or with cement and asbestos fiber in suitable proportions to provide a comparatively light weight product which possesses the necessary rigidity and durability for articles of this type.

In producing shingles and similar molded products in accordance with my invention, I preferably employ clean granulated cork, free from dirt or foreign matter and of a degree of fineness which may vary with the character of the product desired. I prefer to employ finely granulated cork of a size not greater than that of granulated sugar when producing dense mixes of materials and dense products, such as shingles.

In preparing the cork for use, I moisten the same with water, stirring the cork about so that the moisture is distributed substantially uniformly over the cork particles. The cork thus prepared is then mixed with dry cement in the desired proportions. By preparing the cork as described, I have found that the cement and cork can be intimately mixed and products produced from the resulting mixture are free from air holes or bubbles even when not subjected to pressure during the process of manufacture. The proportions of the materials used may be varied considerably to produce articles of varying weight and hardness suitable for numerous purposes. Ordinarily, however, when producing shingles or sheet material, I employ an amount of dry cork equal to from about 15 to 100% of the weight of the cement employed. For instance I have produced sheets of material containing as little as one part by weight of granulated cork to six parts of cement and have produced sheets of material containing equal parts by weight of granulated cork and cement. Asbestos fiber or other fibrous materials such as those commonly employed in the art, may also be added to the mix from which articles are produced and filler materials, such as sand, ashes, slag and the like may be used in producing products in accordance with my invention. The materials may be mixed in any suitable apparatus and molded or formed as desired.

In a preferred method of producing a mix suitable for use in making shingles, I employ clean granulated cork which preferably is fine enough to pass a 10 mesh screen, although I may use coarser or finer grades of granulated cork. The cork is moistened with water as described above to dampen the particles uniformly prior to incorporating the same in the mix. I then mix one part by weight of the moistened granulated cork (based on the dry weight of the cork) with two parts by weight of Portland cement and one part of long fiber asbestos. These materials are mixed dry and when thoroughly blended or incorporated form a mixture suitable for use in producing shingles or other molded articles.

In producing shingles or cementitious sheets from the mixture thus produced, the mixture is formed into a layer of the desired thickness on a moving blanket or web. Water is sprayed onto the moving layer of mixed materials and the wet mixture is allowed to become partially set by the hardening of the cement. The sheet thus formed is then cut to the desired shape and preferably is subjected to pressure, say 5000 pounds per square inch, before the material has completely set.

In an alternative method of producing shingles and the like using a mixture of materials such as that described above, the mix is placed in a vessel, water is added and the mixture stirred to produce a semi-fluid paste. The paste is then formed into a sheet by applying one or more layers of the paste to a web or roll in the usual manner of making paper felts, cement asbestos shingles and the like. The material after partially setting, is subjected to hydraulic pressure. If preferred, the material may be allowed to set completely without applying pressure thereto.

I may, if desired, apply coating or impregnating material to shingles produced as described above to improve the weather resisting properties of the shingles and may provide a granular or decorative surface to the shingles either before or after the cement of the composition has become completely set and hardened.

Shingles produced in accordance with my invention are considerably lighter than the ordinary cement or cement asbestos shingles and therefore can be shipped at less cost than the comparatively heavy shingles of this type produced heretofore. Shingles made from 1 part cement to 1 part cork, as described above, may have a specific gravity of 0.622; shingles made from 2 parts cement to 1 part cork, a specific gravity of 1.410. The addition of asbestos fibers increases the specific gravity of the product. The shingles are durable and resistant to fracture. Because of the light weight of the shingles, it is unnecessary to provide heavy roof decks or foundations for the shingles, that is, rafters and roof sheathing boards. Furthermore, the shingles can be readily nailed to a roof without breaking or injuring the shingles.

Although I have described my invention as used in producing shingles and sheet material, it will be apparent that other molded articles can be produced from the novel composition described herein and other methods of forming shingles and sheet material therefrom may be employed without departing from my invention.

I claim:

A relatively light weight rigid roofing element which does not break easily when subjected to hammer blows such as are used to drive nails to secure the shingle, said element consisting substantially entirely of a mixture of cork, Portland cement and fibrous material, in which the dry weight of the cork is from about 15% to 100% of the weight of the cement.

NORMAN P. HARSHBERGER.